UNITED STATES PATENT OFFICE.

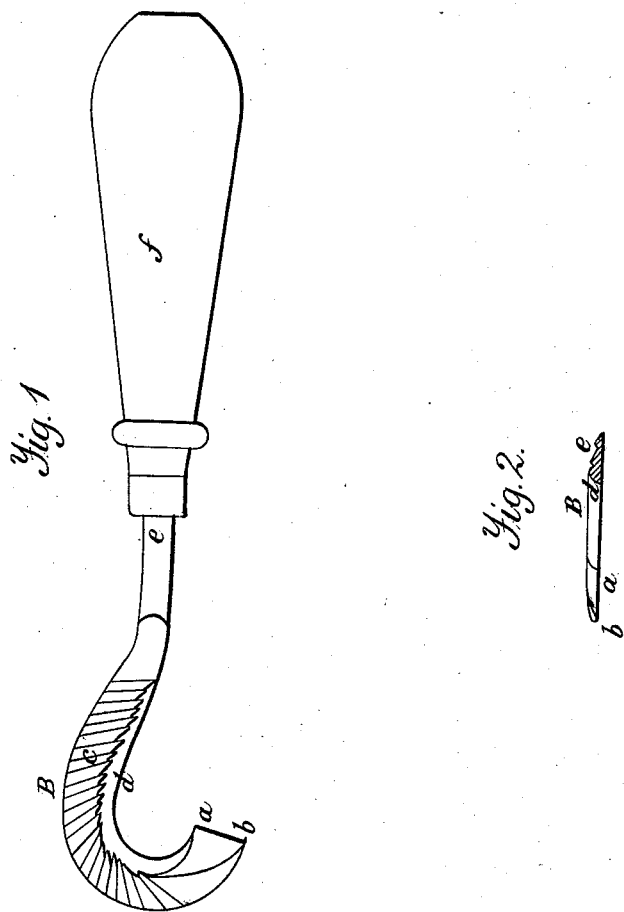

JOHN B. REED, OF WARREN, MASSACHUSETTS, ASSIGNOR TO HIMSELF AND DAVID R. TYLER, OF SAME PLACE.

IMPROVED WELT-TRIMMER.

Specification forming part of Letters Patent No. 51,519, dated December 12, 1865.

*To all whom it may concern:*

Be it known that I, JOHN B. REED, of Warren, in the county of Worcester and State of Massachusetts, have invented a new and useful Improvement, which I term a "Welt-Trimmer," it being designed to be used by shoemakers and for paring and finishing welts or rands of boots or shoes; and I do hereby declare the same to be fully described in the following specification and represented in the accompanying drawings, of which—

Figure 1 is a side view and Fig. 2 a transverse section of it.

In such drawings the implement is shown as having a blade, B, curved or bent in the form of a hook, and terminating at its end in a chisel-cutting edge, $a$, and a guard or angular projection, $b$, arranged with respect to each other, as represented.

The blade B is triangular in transverse section, its upper surface being beveled in opposite directions, as shown at $c\ d$. The longer or outer beveled face, $c$, of such blade is provided with rasp-teeth, as exhibited in the figures. A shank, $e$, extending from the blade, enters a handle, $f$.

With this tool the shoe-maker can either cut or rasp away the welt between the sole and the upper-leather of a shoe, as may be desirable, without danger of injury to the said upper-leather, for the guard $b$ will prevent the cutting-edge $a$, when used, from coming in contact with the said upper-leather.

I claim—

The welt-trimmer made substantially as described, viz: with the beveled blade B, having the cutting-edge $a$, the guard $b$, and the rasp arranged on it and provided with a shank and handle, as explained.

JOHN B. REED.

Witnesses:
 R. H. EDDY,
 G. H. WASHBURN.